April 7, 1925.                    1,532,431
A. F. MITCHELL
HEADLIGHT
Filed Sept. 16, 1924
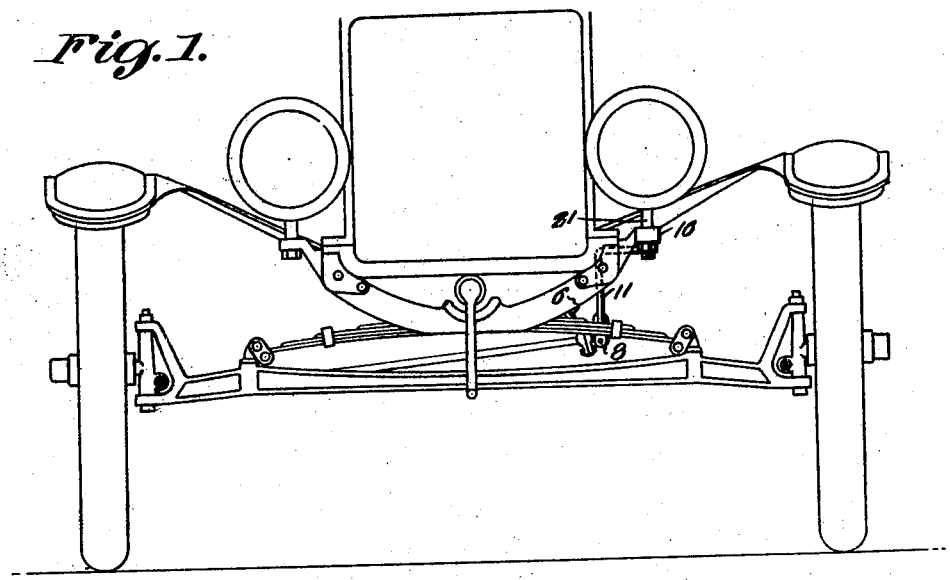
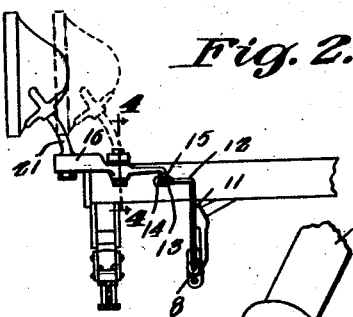
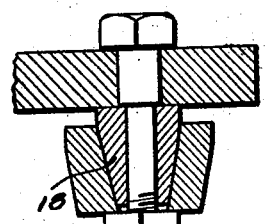
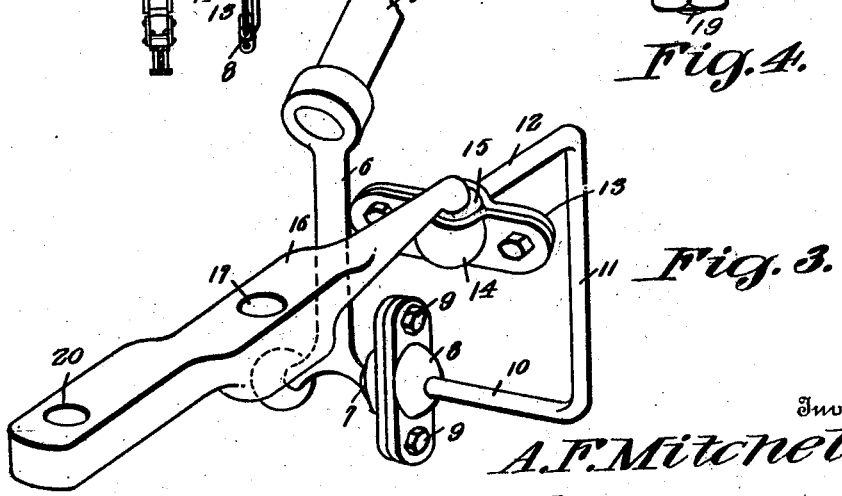
Inventor
A. F. Mitchell
By C. A. Snow & Co
Attorneys.

Patented Apr. 7, 1925.

1,532,431

UNITED STATES PATENT OFFICE.

ALEXANDER F. MITCHELL, OF FROST, TEXAS.

HEADLIGHT.

Application filed September 16, 1924. Serial No. 738,050.

*To all whom it may concern:*

Be it known that I, ALEXANDER F. MITCHELL, a citizen of the United States, residing at Frost, in the county of Navarro and State of Texas, have invented a new and useful Headlight, of which the following is a specification.

The present invention relates to dirigible headlights, the primary object of the invention being to provide novel means to be attached to the usual motor vehicle construction, whereby the headlights of the vehicle may be automatically turned with the front wheels of the vehicle to illuminate the path of travel of the vehicle.

Another important object of the invention is to provide a device of this character which may be readily and easily installed, eliminating the necessity of making extensive changes in the usual motor vehicle construction to install the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view disclosing a vehicle equipped with headlights constructed in accordance with the invention.

Figure 2 is a side elevational view of a headlight, the axle of the vehicle being shown in section.

Figure 3 is a perspective view of the connecting link illustrating the manner of connecting the same to the steering post.

Figure 4 is a sectional view taken on line 4—4 of Figure 2.

Referring to the drawing in detail, the reference character 5 designates the steering post of a motor vehicle to which the connecting link 6 is connected, the link having a ball 7 at one end thereof to be engaged by the socket member 8 which is formed with sections, the sections being bolted together at 9.

Formed integral with one of the sections of the socket, is an arm 10 extending therefrom, the arm 10 having an integral upwardly extended portion 11 terminating in a right angled portion 12 that also extends transversely of the arm 10, where it carries the section 13 of the socket member 14. This socket member 14 accommodates the ball 15 that extends downwardly from one end of the arm 16 which arm is formed with an opening 17 through which the bearing 18 extends, there being provided a bolt 19 for securing the arm 16 in position.

An opening 20 is formed in the forward end of the arm 15 and accommodates the shank 21, of the headlight so that as the arm 16 moves in a horizontal plane, the headlights will be moved in a similar manner to illuminate the path of travel of the machine.

From the foregoing it will be obvious that due to this construction when the link 6 moves, a relative movement will be imparted to the arm 16 to cause it to move in a horizontal plane moving the headlight.

This movement of the lamp supporting arm is accomplished by the socket member 8 moving upwardly which causes a twisting movement of the upper end of the arm 10 and socket carried thereby to move the arm 16 in a horizontal plane.

While I have shown and described the operating mechanism as connected with one of the headlights, of a motor vehicle, it is to be understood that by connecting the adjacent headlights by a rod, the headlights will move simultaneously with the steering post.

I claim:—

1. In a dirigible headlight, a lamp supporting arm pivotally supported intermediate its ends, said lamp supporting arm having a ball formed at one end thereof, an arm having an upwardly and inwardly extended portion, said last mentioned arm carrying socket members at its ends, a link secured to the steering rod of a vehicle, said link having a ball, said socket members adapted to accommodate the ball of the link and arm, and said lamp supporting arm adapted to move in a horizontal plane when the link is moved upwardly.

2. In a dirigible headlight, a lamp supporting arm pivotally supported intermediate its ends, said lamp supporting arm having a ball formed at one end thereof, an arm having an upwardly extended central portion and a laterally extended upper end portion, the laterally extending portion extending at right angles to the upwardly extended portion, the lower end of the second mentioned arm extending laterally and at right angles to the upper end thereof, socket members formed at the ends of the second mentioned arm, one of said socket members adapted to accommodate the ball of the first mentioned arm, and an arm having a ball received by the socket member of the lower end of the arm.

In testimony that I claim the foregoing as my own, I have hereto affixed my signature in the presence of two witnesses.

ALEXANDER F. MITCHELL.

Witnesses:
 FRANK HENDERSON,
 JOSH H. BASON.